United States Patent [19]

Vantouroux

[11] Patent Number: 4,666,325

[45] Date of Patent: May 19, 1987

[54] CONNECTOR

[75] Inventor: Patrick Vantouroux, Fleury Les Aubrais, France

[73] Assignee: Compagnie Deutsch, France

[21] Appl. No.: 657,403

[22] Filed: Oct. 3, 1984

[51] Int. Cl.⁴ .............................................. F16B 2/06
[52] U.S. Cl. ........................................ 403/13; 403/14; 403/405.1; 403/409.1; 339/186 M; 339/206 P
[58] Field of Search .................... 403/405, 13, 14, 409; 339/206, 207, 208, 209, 210, 91 R, 125, 65, 66, 17 L, 17 LM, 186, 184

[56] References Cited

U.S. PATENT DOCUMENTS

| | | | |
|---|---|---|---|
| 3,173,734 | 3/1965 | Hartwell | 339/65 |
| 3,471,822 | 10/1969 | Van Baelen | 339/206 |
| 3,842,392 | 10/1974 | Aldridge et al. | 339/47 R |
| 4,497,526 | 2/1985 | Myers | 339/125 R |

FOREIGN PATENT DOCUMENTS 2021547 11/1971 Fed. Rep. of Germany ... 339/186 M

Primary Examiner—Andrew V. Kundrat
Assistant Examiner—Joseph A. Fischetti
Attorney, Agent, or Firm—Darby & Darby

[57] ABSTRACT

A connector has juxtaposed modular blocks bearing either sockets or pins. The modules are removably mounted, side-by-side, in adjoining recesses of a generally flat, rectangular housing. The adjoining recesses are provided with a number of notches which are initially closed off during manfacturing. The insertable modules are provided with one or more protruding tabs which cooperatively fit into the corresponding notches in the housing, provided that the notches have been selectively opened in order to receive the tabs of the particular module. Furthermore, the mating connector portions may similarly be provided with corresponding tabs and notches, the latter being initially closed during manufacture and later selectively opened to receive a particular connector having certain tabs thereon.

3 Claims, 15 Drawing Figures

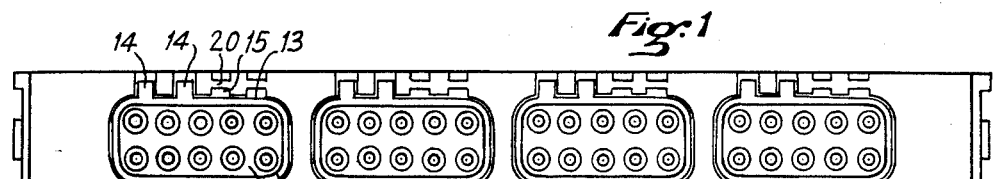
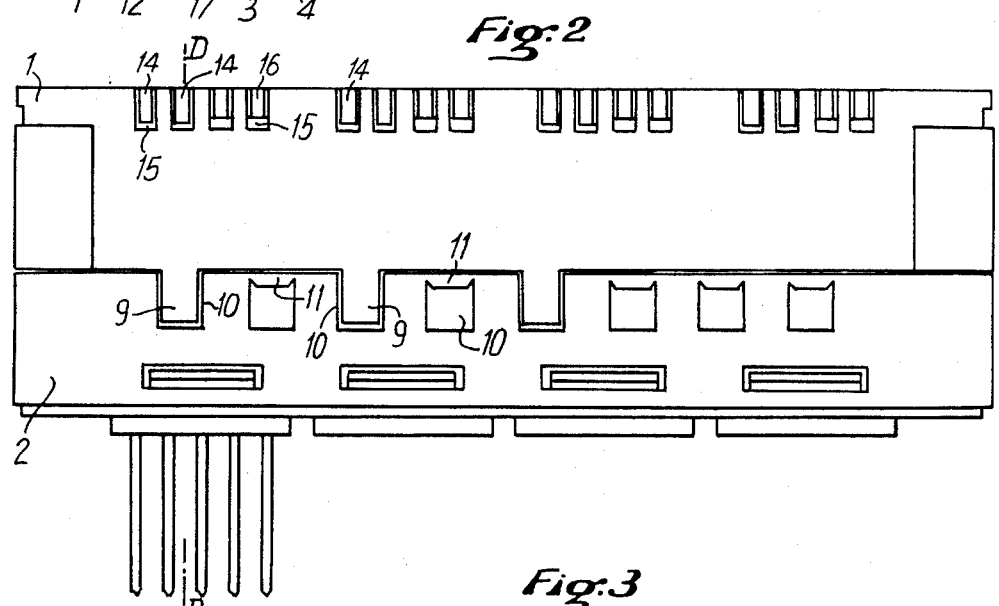
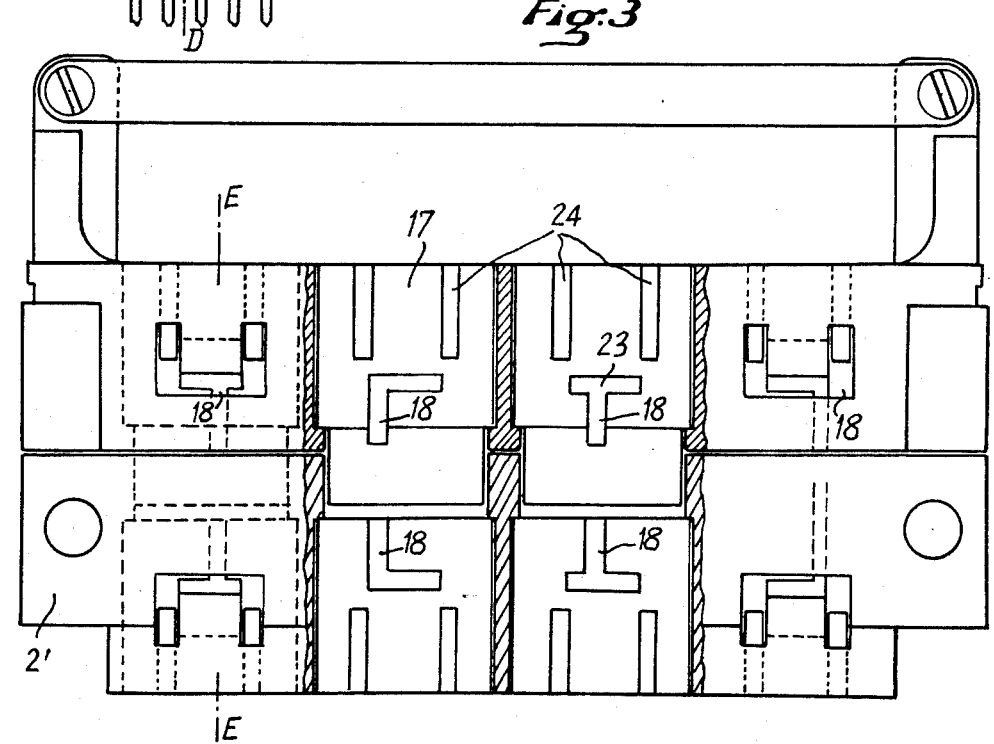

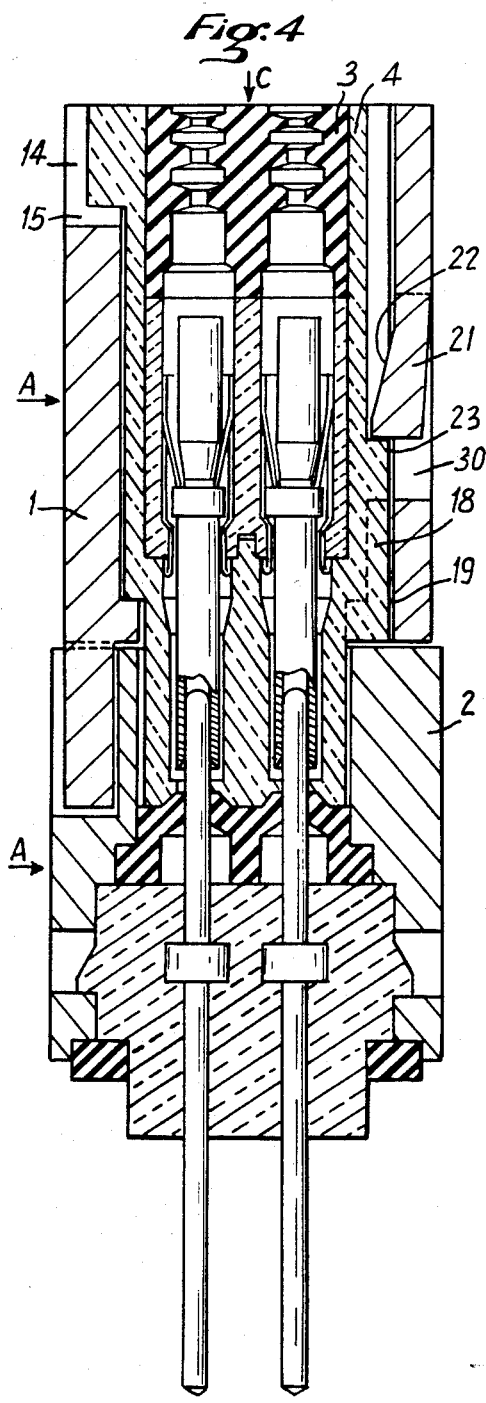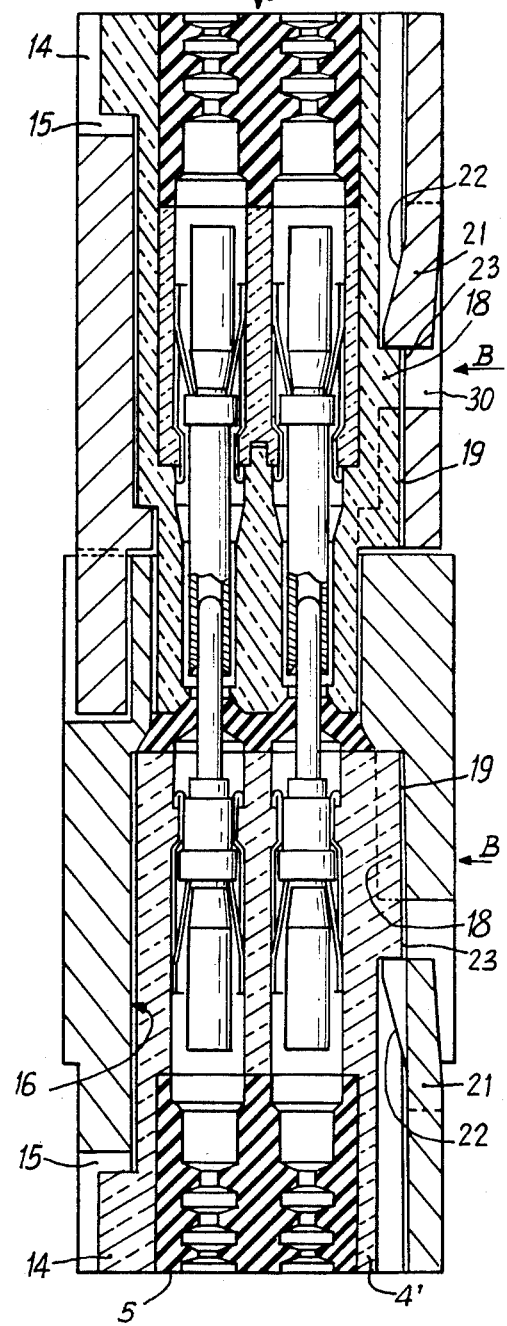

CONNECTOR

BACKGROUND OF THE INVENTION

This invention relates to electrical connectors for mating electric current-carrying members. More particularly, the invention concerns connectors which may be "keyed" in order to prevent errors in connecting male/female connector pairs.

DESCRIPTION OF THE RELATED ART

In the present state of advanced technologies such as aerospace technology, connectors commonly known as "push-pull" type connectors are used. These connectors generally comprise a cylindrical member bearing many male contacts protruding from the end of the cylindrical member. Fixed and mobile parts of the connector are usually mounted within metal housings or shells. Mating housings fit inside one another and are equipped with locking systems. Such a connector is described in French Pat. No. 73.37329 filed Oct. 19, 1973 in the name of the applicant.

With such known connectors, a multiplicity of precautions must be taken in order to avoid erroneously connecting the wrong pair of connectors. One prior solution was to use many different models or types of connectors when using many cables all at once. This approach made almost impossible the use of multiple pairs of connectors of the same type for several differently wired cables. In addition, the varying sizes and locking and keying mechanisms of such connectors create non-negligible weight and bulk.

SUMMARY AND OBJECTS OF THE INVENTION

An object of the invention is to provide a low mass, low bulk connector which is easily adapted to various wiring configurations.

Another object is to provide a connector having improved coupling and mounting features which prevent errors in connector mating.

According to the invention, the mating part of the connector comprises juxtaposed modular blocks bearing either sockets or pins. These modular blocks are generally domino-shaped, comprising a rigid plastic housing in which are mounted either pins or sockets. The modules are removably mounted, side-by-side, in adjoining recesses of a generally flat, rectangular housing. Both male and female housings may be provided. In each, the adjoining recesses are provided with a number of notches which are initially closed off during manufacturing. The insertable modules are provided with one or more protruding tabs which cooperatively fit into the corresponding notches in the housing, provided that the notches have been selectively opened in order to receive the tabs of the particular module. Furthermore, the mating connector portions may similarly be provided with corresponding tabs and notches, the latter being initially closed during manufacture and later selectively opened to receive a particular connector having certain tabs thereon.

BRIEF DESCRIPTION OF THE DRAWINGS

Features of the invention will be more fully understood when discribed below, taken in conjunction with the drawings in which:

FIG. 1 is an end view of one embodiment of a connector according to the invention, taken along arrow C in FIG. 4 or FIG. 5;

FIG. 2 is a side view of connector having a modular mobile section, taken along arrow A in FIG. 4;

FIG. 3 is side view, partially in section, of another embodiment of a connector, the connector having modular mobile and fixed sections;

FIG. 4 is a sectional view of the connector of FIG. 2 taken along line DD;

FIG. 5 is a sectional view of the connector of FIG. 3 taken along line EE;

DETAILED DESCRIPTION OF THE PREFERRED EMBODIMENTS

Figure 6:
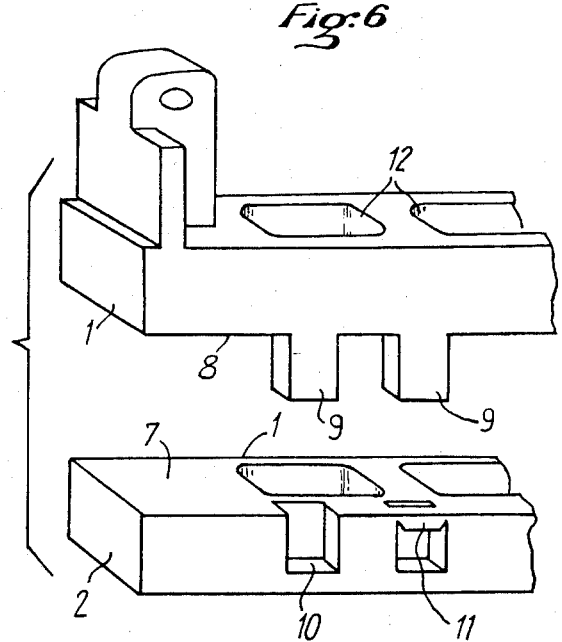
FIGS. 6-10 are detail sketches, in perspective, illustrating various keying features of the invention.

Referring generally to FIGS. 1, 2 and 4, an embodiment of the inventive connector is shown having a mobile part 1 and a fixed part 2. The mobile part 1 comprises a series of modules removably mounted side-by-side in adjacent recesses 12 of a housing 1 which forms the body of the mobile part. The modules are generally domino-shaped, and are formed of an elastomer block 3 bearing the sockets (or pins), the elastomer block 3 being fixed, for example, by gluing, in a rigid plastic modular housing 4 to constitute the module. As is seen in FIGS. 1, 2 and 4, the connector assembly 1 as the general form of a flat cassette. This reduces the bulk of the connector, as well as the bulk of an assembly of several of such connectors.

Now referring to the embodiment shown in FIGS. 1, 3 and 5, the fixed part 2 similarly comprises a number of pin or socket retaining modules as was the case for the mobile part 1 in the embodiment of FIG. 2. As seen in FIG. 5, the elastomer blocks 5 are fixed in the domino-shaped modular housings 4' of a rigid plastic material, identical in construction to those of the mobile part, as discussed above. The modules are similarly placed in adjacent recesses 12 of the fixed part housing 2'. As thus described, the inventive connector is a low mass, low bulk device.

Turning now to the keying features of the invention, FIG. 6 illustrates the housings of the fixed part 2 and the mobile part 1 of the connector. Mobile part 1 is provided with keys 9 protruding from its lower face 8. The upper face 7 of the fixed part 2 is provided with correspondingly spaced notches 10 which line up with the spaced keys 9 of mobile part 1. When manufactured, the notches 10 are effectively blocked by a partition or bridge 11 which prevents a key 9 from fitting into its corresponding notch 10. According to the pattern of keys present on the mobile part 1, the bridges 11 may be selectively eliminated so as to key a particular fixed part 2 to a particular mobile part 1. In FIG. 6, bridge 11 is shown as being still in place, while notch 10 has been opened by elimination of the bridge.

Figure 9:
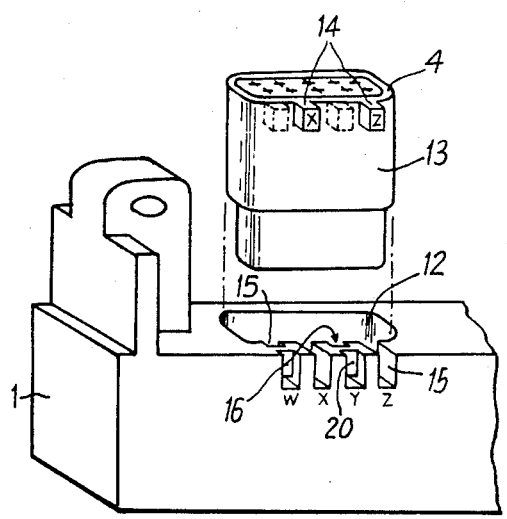
Figure 10:
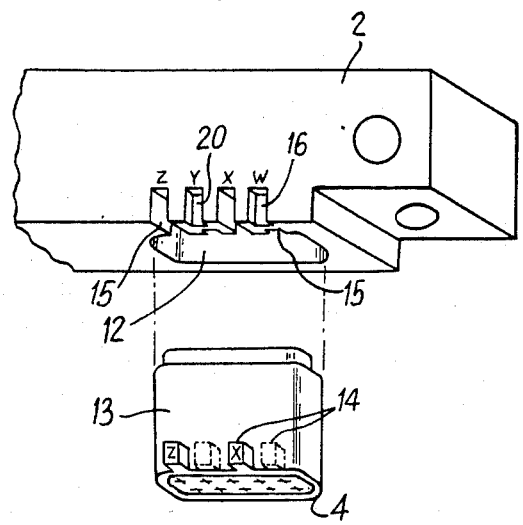

The pin and socket modules utilize a similar keying concept. Referring now to FIGS. 9 and 10, modules 4 are shown in position to be inserted into a connector mobile part 1 and fixed part 2, respectively. The outer face 13 of the modular housing 4 bear protuding tabs 14 in a particular desired spaced pattern. In FIG. 9, four possible tabs are shown, with only two, X and Z, actually present. The tabs 14 are positioned so as to correspond to notches 15 on the inner face 16 of each recess 12 of the connector housing 1 or 2 (see FIGS. 3 and 5). During manufacture, the notches 15 are barred by partitions or bridges 20, in similar fashion to the bridges 11 previously described. The tabs 14 and bridges 20 can be retained or eliminated in inverse correspondence, or in other words. so as to form corresponding patterns to assure a proper match. As can be seen in FIGS. 9 and 10, the partitions or bridges 20 in the notches corresponding to tabs X and Z have been eliminated.

Figure 7:
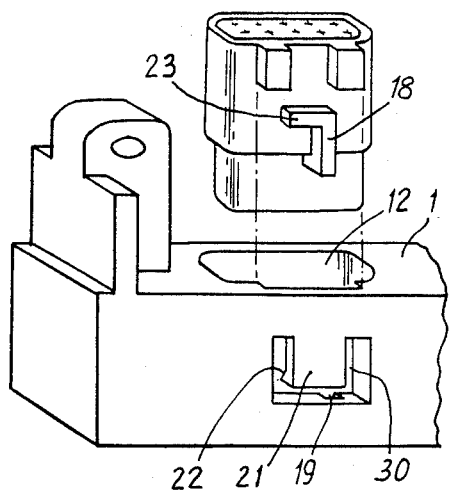
Figure 8:
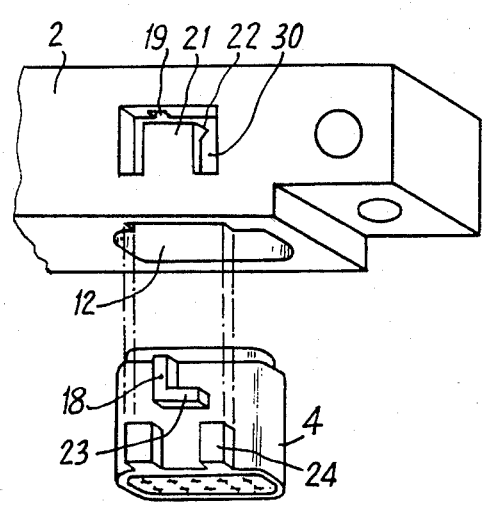

Referring now to FIGS. 3, 7 and 8, the opposed outer face 17 of each module housing 4 is provided with special protrusions 18 forming prepositioning keys. These keys 18 extend longitudinally along the direction of the pins or sockets and correspond to notches 19 provided on the corresponding inner face of each of the recesses 12, as shown in FIGS. 7 and 8. The position of each key 18/notch 19 pair varies from one module to the next and from one recess to the next accordingly.

With a connector constructed as described above, the following benefits and advantages are achieved. Firstly, proper coupling of matched fixed and mobile housings is ensured by the user by the choice of corresponding tabs and notches in the edges of these housings. Particular tabs may be retained, with the corresponding bridges which block the corresponding notch broken away. This prevents transposition of housing when coupling a number of similar connectors. The tabs 9 and partitions 11 are provided at the manufacturing stage and it is up to the user to perform the operation of polizarition. Thus, no modification of the basic connector model is required in the course of manufacture.

Secondly, proper positioning of the modules in the housing is ensured by the prepositioned keys on the side surfaces of each module and the corresponding notches set in the housing recesses. This construction prevents any transposition of the modules between the recesses of a given connector housing. Each module has a mandatory position in its housing, which is built-in and is not subject to change by the user. This leads to manufacture of as many modules as there are recesses in a connector. But according to the third keying feature described below, a great many more keyed possibilities which cannot be incorrectly coupled are made possible.

The third keying feature, i.e., the differentiation of modules due to the selection of tabs 14 which are either retained or eliminated, as well as the selectively removable partitions 20, provides further connector variations while still using the same basic structure. These tabs and bridges are formed during manufacture, and it is up to the user to make the selection with consideration given to prepositioning of each module. Thus, the same basic connector structure permits a wide variety of mating possibilities without error in coupling, i.e., without the risk of coupling unmatched connector parts. Furthermore the use of standard equipment including only a limited series of modular housings is provided.

Referring now to FIGS. 7 and 8, yet another feature of the invention will be described. A wall of each of the recesses 12 has a U-shaped opening 30 with the arms of the U pointed toward the module introduction face of the connector part. The thickness of the wall of recess 12 is reduced along the zone separating the opening 30 from the introduction face and along the base of a central tab 21 forming the middle of the U-shape. The central tab 21 has a thickness which gradually returns to the same thickness of the unreduced housing wall along an inclined face forming a ramp 22. The corresponding outer face of each module includes a bar 23 protruding from the module housing 4 to form a stop. The stop 23 is located so as to be positioned in the lower arm of U-shaped opening 30 when the module is in place.

The thickness of protruding bar 23 is at most equal to the reduction in thickness of the wall in the zone of opening 30. Thus the insertion of the modules results in a retraction of tab 21 by elasticity and the locking of the module by cooperation of bar 23 with the lower part of tab 21. In order to extract the module from its housing, tab 21 must be retracted so as to disengage from the bar 23.

Figure 15:
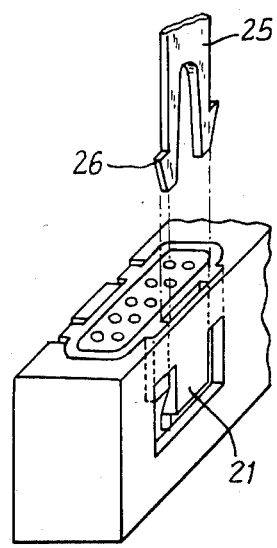
FIG. 15 is a perspective view illustrating the removal of a module using a special tool.
Figure 11:
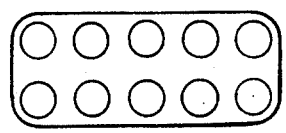
FIGS. 11-14 are illustrations of various pin arrangements for the modules.
Figure 12:
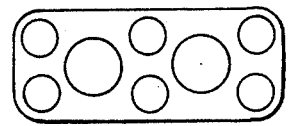
Figure 13:
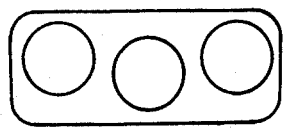
Figure 14:
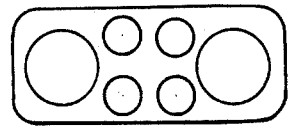

Referring to FIG. 8, the outer face of the module is additionally provided with two longitudinal tabs 24 which align with the lateral arms of the U-shaped opening 30. Referring to FIG. 15, it can be seen that the tabs do not extend as far as the end of tab 21 of the housing, allowing the insertion of a special extraction tool 25. The extraction tool has the same thickness as the bar 23 and the protruding tabs 24. The tool 25 is in the form of a fork having the same width as the space separating the lateral tabs 24. The arms of the fork have outer lateral cusps 26 which can be inserted elastically behind the ends of the tabs 24 once the tool 25 abuts against the bar 23 and has disengaged the latter from its engagement with tab 21.

The above described connector is advantageously completed by any appropriate locking device, placed, for example, at the lateral ends of the fixed and mobile housings to end 1, respectively. Such a device is described in French Pat. No. 83.06206 filed on Apr. 15, 1983 under the title "Locking And Guidance Device For The Coupling Of A Connector" in the name of the applicant.

Owing to the construction as a flat cassette, several connectors according to the invention can be mounted side-by-side in a stack or as an alternative, assembled together by bolts, for example. Since the modules are make of rigid plastic, there is no special problem regarding electric insulation. As shown in FIGS. 11-14, the modules may have a variety of pin arrangements which provides further additional latitude for different connections while using the same basic equipment.

I claim:
1. An improved connector comprising:
a first rectangular, generally flat connector housing section having adjacent module-receiving recesses in a module-receiving face at an end of said first housing section,
a plurality of spaced, removable connector mating tabs attached to and protruding outwardly along a mating surface of said first housing section,
a second rectangular, generally flat connector housing section having a plurality of selectively openable notches spaced along and extending into a mating surgace thereof, said notches having a bridge member blocking access to said notches when not selectively opened, said notches being spaced so as to correspond to the spacing of said removable connector mating tabs,
each of said module-receiving recesses having a specially prepositioned notch in an interior surface thereof, the relative position of each notch with respect to its associated recess being different than the positions of the other notches in other recesses of said first connector housing section, said notches providing keys for ensuring proper placement of a module in a predetermined recess for receiving that module, said module having a prepositioning tab for insertion into said prepositioned notch, a plurality of modules capable of holding electrically conductive pins and sockets therein in predetermined patterns, said modules being mounted in said module-receiving recesses located in said first connector housing section, a plurality of spaced, selectively removable module keying tabs protruding laterally outwardly from an outer surface of said modules at a mating end of said modules, said module-receiving recesses having selectively openable keying notches in an inner surface near said mating surface of said first housing section, said notches spaced so as to correspond to the spacing of said module keying tabs, one face of each said module-receiving recess further having a U-shaped opening oriented toward said respective mating surfaces, with a housing wall portion defined by the center of said U-shape constituting a module locking tab, wherein said side wall through which said U-shaped opening extends is of reduced thickness in a region between said U-shaped opening and said mating surface, and wherein a first portion of said module locking tab is of like reduced thickness, a second portion of said tab hiving a gradually increasing thickness toward the end of the tab, at which said thickness is substantially equal to an unreduced housing wall thickness, and wherein each said module has a protruding transversely oriented bar on an outer face, positioned so as to engage and lock beyond said locking tab when said module is inserted in its proper recess, the thickness of said bar being at most equal to the amount by which said housing wall thickness is reduced in said reduced thickness regions.

2. The connector of claim 1, wherein said second connector housing section also has adjacent module-receiving recesses in a module-receiving face at an end thereof, and said recesses each similarly have said specially prepositioned notch and said selectively openable keying notches therein, said modules also mounted in said recesses of said second connector housing section.

3. The connector of claim 1, wherein said outer face also bears longitudinal protrusions extending from said mating surface, said protrusions ending a predetermined distance away from said transverse bar and having a thickness at most equal to that of said transverse bar.

* * * * *